US012609755B2

(12) United States Patent
Kough et al.

(10) Patent No.: US 12,609,755 B2
(45) Date of Patent: *Apr. 21, 2026

(54) COMMUNICATION USING ARBITRARY SELECTABLE POLARIZATION

(71) Applicant: Ruckus IP Holdings LLC, Claremont, NC (US)

(72) Inventors: Douglas Blake Kough, San Jose, CA (US); Khaled A. Obeidat, San Jose, CA (US); Rajesh Koganti, Santa Clara, CA (US); Ivaylo Tankov, San Carlos, CA (US)

(73) Assignee: Ruckus IP Holdings LLC, Horsham, PA (US)

( * ) Notice: Subject to any disclaimer, the term of this patent is extended or adjusted under 35 U.S.C. 154(b) by 374 days.

This patent is subject to a terminal disclaimer.

(21) Appl. No.: 17/889,417

(22) Filed: Aug. 17, 2022

(65) Prior Publication Data

US 2022/0393755 A1      Dec. 8, 2022

Related U.S. Application Data

(63) Continuation-in-part of application No. 17/178,480, filed on Feb. 18, 2021, now Pat. No. 11,462,840.

(Continued)

(51) Int. Cl.
*H04B 7/10*      (2017.01)
*H04B 7/06*      (2006.01)

(52) U.S. Cl.
CPC ............. *H04B 7/10* (2013.01); *H04B 7/0602* (2013.01)

(58) Field of Classification Search
CPC ...... H04B 7/10; H04B 7/0413; H04B 7/0617; H04B 17/102; H04B 17/336; H04B 7/002;

(Continued)

(56) References Cited

U.S. PATENT DOCUMENTS

| | | | |
|---|---|---|---|
| 5,036,331 A | 7/1991 | Dallabetta et al. | |
| 6,184,828 B1 | 2/2001 | Shoki | |

(Continued)

FOREIGN PATENT DOCUMENTS

| | | | |
|---|---|---|---|
| WO | 2007027301 A2 | 3/2007 | |

OTHER PUBLICATIONS

"Notification of Transmittal of the International Search Report and the Written Opinion of the International Searching Authority, or the Declaration for corresponding International Application No. PCT/US2021/18277, mailing date: Apr. 28, 2021, (15 pages)".

(Continued)

*Primary Examiner* — Golam Sorowar
(74) *Attorney, Agent, or Firm* — Myers Bigel, P.A.

(57) ABSTRACT

An electronic device that uses an arbitrary transmit polarization is described. This electronic device includes: a first antenna having a first predefined polarization; and a second antenna having a second predefined polarization, where the second predefined polarization is different from the first predefined polarization. During operation, an interface circuit in the electronic device selectively transmits, from the first antenna, first wireless signals corresponding to the packet or the frame. Moreover, the interface circuit selectively transmits, from the second antenna, second wireless signals corresponding to the packet or the frame, where the second wireless signals have a same magnitude as the first wireless signals, and the second wireless signals are transmitted from the second antenna concurrently (or at the same time) as the first wireless signals are transmitted from the first antenna. Note that the interface circuit may dynamically modify the transmit polarization during the communication.

15 Claims, 6 Drawing Sheets

Related U.S. Application Data

(60) Provisional application No. 62/979,282, filed on Feb. 20, 2020.

(58) Field of Classification Search
CPC .............. H04B 7/15571; H04B 7/0689; H04B 1/0475; H04B 1/10; H04B 1/1027; H04B 1/12; H04B 1/123; H04B 1/525; H04B 17/12; H04B 17/18; H04B 17/204; H04B 17/34; H01Q 1/246; H01Q 21/245; H01Q 3/36; H01Q 21/24; H01Q 1/002; H01Q 1/523; H01Q 3/2629; H01Q 1/2291; H01Q 3/24; H01Q 21/28; H01Q 1/42; H01Q 15/14; H01Q 21/065; H01Q 9/0414; H01Q 1/2266; H01Q 3/247; H01Q 1/20; H01Q 1/48; H01Q 13/04; H01Q 13/08; H04W 72/541; H04W 16/28; H04W 24/08; H04W 52/243; H04W 84/12; H04W 88/08; H04W 52/42; H04W 52/367; H04W 72/0446; H04W 72/046; H04W 72/12; H04W 74/0816; H04W 52/18; H04W 52/245; H04W 52/26; H04W 52/262; H04W 52/267; H04W 64/00; H04W 24/02; H04W 28/0268

See application file for complete search history.

(56) References Cited

U.S. PATENT DOCUMENTS

| | | | |
|---|---|---|---|
| 8,024,003 B2 | 9/2011 | Cezanne et al. | |
| 8,306,479 B1 | 11/2012 | Lorang | |
| 9,496,901 B2 | 11/2016 | Wehrmann et al. | |
| 11,462,840 B2 * | 10/2022 | Kough ................. | H04B 7/0671 |
| 2003/0162566 A1 | 8/2003 | Shapira et al. | |
| 2005/0285784 A1 | 12/2005 | Chiang et al. | |

| | | | |
|---|---|---|---|
| 2007/0046558 A1 | 3/2007 | Tillery | |
| 2008/0280581 A1 | 11/2008 | Rofougaran et al. | |
| 2009/0051618 A1 | 2/2009 | Park et al. | |
| 2009/0227260 A1 * | 9/2009 | Anreddy ................. | H04B 7/10 |
| | | | 455/562.1 |
| 2009/0262786 A1 | 10/2009 | Hammersley | |
| 2010/0317306 A1 | 12/2010 | Lee et al. | |
| 2011/0195661 A1 | 8/2011 | Miyashita | |
| 2011/0235755 A1 * | 9/2011 | Yang .................... | H04B 7/0837 |
| | | | 375/340 |
| 2012/0003946 A1 | 1/2012 | Ono | |
| 2012/0064825 A1 | 3/2012 | Landon et al. | |
| 2012/0208468 A1 | 8/2012 | Wang et al. | |
| 2012/0252369 A1 | 10/2012 | Asplund et al. | |
| 2013/0072125 A1 | 3/2013 | Yoon et al. | |
| 2013/0124883 A1 | 5/2013 | Addepalli et al. | |
| 2013/0148553 A1 | 6/2013 | Ekbatani et al. | |
| 2013/0343235 A1 | 12/2013 | Khan | |
| 2014/0011461 A1 | 1/2014 | Bakalski et al. | |
| 2014/0133599 A1 | 5/2014 | Ouchi et al. | |
| 2016/0036506 A1 * | 2/2016 | Kanai .................. | H04B 7/0617 |
| | | | 370/329 |
| 2016/0233944 A1 | 8/2016 | Viswanathan | |
| 2017/0033848 A1 * | 2/2017 | Cordeiro .............. | H04B 7/0404 |
| 2017/0078013 A1 * | 3/2017 | Sanderovich ........... | H04B 7/10 |
| 2017/0188379 A1 * | 6/2017 | Shtrom ................. | H04L 5/0023 |
| 2017/0328682 A1 | 11/2017 | Smith | |
| 2018/0006379 A1 * | 1/2018 | Cariou ................. | H04W 16/28 |
| 2018/0035392 A1 * | 2/2018 | Patel ................... | H04W 52/367 |
| 2020/0280997 A1 * | 9/2020 | Xiao .................... | H04B 7/0695 |

OTHER PUBLICATIONS

"European Search Report corresponding to European Application No. 21158275.4, mailing date: Jul. 1, 2021, 7 pages".
"Office Action, corresponding to European Application No. 21158275.4, dated Aug. 3, 2023, 5 pgs".

* cited by examiner

ELECTRONIC
DEVICE
800

MEMORY SUBSYSTEM
812

OPERATING
SYSTEM
824

PROGRAM
INSTRUCTIONS
822

NETWORKING SUBSYSTEM
814

ANTENNA(S)
820

CONTROL
LOGIC
816

INTERFACE
CIRCUIT
818

ANTENNA
NODE(S)
808

BUS
828

PROCESSING
SUBSYSTEM
810

DISPLAY
SUBSYSTEM
826

COMMUNICATION USING ARBITRARY SELECTABLE POLARIZATION

CROSS REFERENCE TO RELATED APPLICATIONS

This application is a continuation of U.S. patent application Ser. No. 17/178,480, "Communication Using Arbitrary Selectable Polarization," filed on Feb. 18, 2021, by Douglas Blake Kough, et al., which claims priority under 35 U.S.C. 119(e) to: U.S. Provisional Application Ser. No. 62/979,282, "Communication Using Arbitrary Selectable Polarization," filed on Feb. 20, 2020, by Doug Blake Kough, et al., the contents of both of which are herein incorporated by reference.

BACKGROUND

Field

The described embodiments relate to techniques for communication. Notably, the described embodiments relate to techniques for communicating using one or more antenna patterns having an arbitrary selectable polarization.

Related Art

Many electronic devices are capable of wirelessly communicating with other electronic devices. For example, these electronic devices can include a networking subsystem that implements a network interface for a wireless local area network (WLAN), e.g., a wireless network such as described in the Institute of Electrical and Electronics Engineers (IEEE) 802.11 standard (which is sometimes referred to as 'Wi-Fi'). For example, a wireless network may include an access point that communicates wirelessly with one or more associated electronic devices (which are sometimes referred to as 'clients').

In order to address effects in a communication environment, during wireless communication one or more transmit antennas having different predefined orthogonal polarizations are often used. (which is sometimes referred to as 'polarization diversity'). For example, separate transmit circuits and transmit antennas with horizontal polarization (or parallel to the ground) and vertical polarization (or perpendicular to the ground) may be used, and the transmit antennas may be spatially offset from each other to ensure that they are decorrelated. In principle, the different predefined polarizations of the spatially decorrelated antennas may help ensure that wireless signals from at least one of the antennas are received by a client at a given location in the communication environment.

However, because the polarization of wireless signals changes on reflection from a surface, the polarization of wireless signals at a client is typically different from the polarization of the wireless signals as transmitted by the transmit antennas. Moreover, while polarization diversity can improve the communication performance, the use of a static or predefined polarization (e.g., only using horizontal or vertical polarization) may not be optimal at a given location of a client. Consequently, there is often a communication-performance opportunity cost associated with current polarization-diversity approaches.

SUMMARY

In a first group of embodiments, an electronic device that communicates a packet or a frame using an arbitrary transmit polarization is described. This electronic device includes: a first antenna having a first predefined polarization; a second antenna having a second predefined polarization, where the second predefined polarization is different from the first predefined polarization; and an interface circuit, communicatively coupled to the first antenna and the second antenna. During operation, the interface circuit selectively transmits, from the first antenna, first wireless signals corresponding to the packet or the frame. Moreover, the interface circuit concurrently (or at the same time) and selectively transmits, from the second antenna, second wireless signals corresponding to the packet or the frame, where the second wireless signals have a same magnitude as the first wireless signals.

Note that the first predefined polarization may be in a horizontal direction and the second predefined polarization may be in a vertical direction. More generally, a given polarization may be: vertical, horizontal, circular or slant. These different configurations may be implemented with a separate antenna or a reconfigurable antenna (which is sometimes referred to as a 'polarization flexible antenna').

Moreover, a phase of the second wireless signals may be different from a phase of the first wireless signals. In some embodiments, the interface circuit may dynamically change the phase of electrical signals corresponding to the second wireless signals relative to the phase of electrical signals corresponding to the first wireless signals. For example, the interface circuit may receive information that specifies feedback (such as an acknowledgment, throughput, a received signal strength indicator, a signal-to-noise ratio or, more generally, a communication-performance metric) associated with a second electronic device, and the phase of the electrical signals corresponding to the second wireless signals may be changed based at least in part on the feedback. Alternatively or additionally, the electronic device may include a phase-modification element (such as a tapped delay line) between the interface circuit and at least one of the first antenna and the second antenna, and the phase-modification element may change the phase of the electrical signals corresponding to the first wireless signals and/or the electrical signals corresponding to the second wireless signals based at least in part on a signal from the interface circuit. Note that by changing the phase, the phase-modification element may change a given polarization or antenna pattern.

In some embodiments, the interface circuit optionally dynamically modifies the magnitude of one of the first wireless signals or the second wireless signals, so that the first wireless signals and the second wireless signals do not have the same magnitude.

Furthermore, the interface circuit may change a given antenna pattern of the first antenna or the second antenna. For example, the given antenna pattern may be changed based at least in part on the feedback.

Additionally, the interface circuit may selectively discontinue transmitting the first wireless signals or the second wireless signals or may selectively disconnect from the first antenna or from the second antenna based at least in part on the feedback. Thus, the interface circuit may dynamically select the first antenna and/or the second antenna. This dynamic selection may be performed on the fly. Alternatively or additionally, the first wireless signals and the second wireless signals may include information that specifies or that is addressed to at least a recipient electronic device, and/or the dynamic selection may be performed on a device-specific basis.

In some embodiments, the interface circuit includes a common transmit path, and electrical signals corresponding to the first wireless signals and the second wireless signals are provided to the first antenna and the second antenna using the common transmit path.

Moreover, the interface circuit may communicate the packet or the frame using multi-input multi-output (MIMO). For example, the electronic device may use 2×2, 4×4, 8×8, 16×16 or N×N (where N is an integer) MIMO.

Furthermore, during operation, the interface circuit may selectively receive, at the first antenna, third wireless signals corresponding to a second packet or a second frame; receive, at the second antenna, fourth wireless signals corresponding to the second packet or the second frame; or receive, at the first antenna, the third wireless signals and receive, at the second antenna, the fourth wireless signals. Note that the fourth wireless signals may have a same magnitude as the third wireless signals, and the fourth wireless signals may be received at the second antenna concurrently as the third wireless signals are received at the first antenna.

In some embodiments, the interface circuit may be dynamically change a phase of electrical signals corresponding to the third wireless signals relative to a phase of electrical signals corresponding to the fourth wireless signals. Alternatively or additionally, the electronic device may include the phase-modification element between the interface circuit and at least one of the first antenna and the second antenna, and the phase-modification element may change the phase of the third wireless signals and/or the fourth wireless signals based at least in part on a second signal from the interface circuit.

Note that the second antenna may be spatially offset from the first antenna. Alternatively, the first antenna and the second antenna may be co-located. In some embodiments, instead of separate first and second antennas, there may be a first antenna element and a second antenna element that are included in the same antenna.

Moreover, the first antenna and the second antenna may be dual band antennas that operate in a first band of frequencies and a second band of frequencies. Alternatively, the first antenna and the second antenna may operate in a single band of frequencies, such as the first band of frequencies, the second band of frequencies or another (different) band of frequencies.

Another embodiment provides the interface circuit.

Another embodiment provides a computer-readable storage medium with program instructions for use with the electronic device. When executed by the electronic device, the program instructions cause the electronic device to perform at least some of the aforementioned operations in one or more of the preceding embodiments.

Another embodiment provides a method, which may be performed by the electronic device. This method includes at least some of the aforementioned operations in one or more of the preceding embodiments.

In a second group of embodiments, an electronic device that communicates a packet or a frame using an arbitrary transmit polarization is described. This electronic device includes: a first set of antenna elements having a first predefined polarization; a second set of antenna elements having a second predefined polarization, where the second predefined polarization is different from the first predefined polarization; and an interface circuit, communicatively coupled to the first set of antenna elements and the second set of antenna elements. During operation, the interface circuit selects one or more first antenna elements in the first set of antenna elements and one or more second antenna elements in the second set of antenna elements, where the first antenna elements correspond to a first antenna pattern and the second antenna elements correspond to a second antenna pattern. Then, the interface circuit transmits, from the first set of antenna elements, first wireless signals corresponding to the packet or the frame, and transmits, from the second set of antenna elements, second wireless signals corresponding to the packet or the frame. Note that the second wireless signals have a same magnitude as the first wireless signals, and the second wireless signals are transmitted from the second antenna elements concurrently as the first wireless signals are transmitted from the first antenna elements.

Moreover, a given antenna pattern in the first antenna pattern and the second antenna pattern may be directional.

Another embodiment provides the interface circuit.

Another embodiment provides a computer-readable storage medium with program instructions for use with the electronic device. When executed by the electronic device, the program instructions cause the electronic device to perform at least some of the aforementioned operations in one or more of the preceding embodiments.

Another embodiment provides a method, which may be performed by the electronic device. This method includes at least some of the aforementioned operations in one or more of the preceding embodiments.

In a third group of embodiments, an electronic device that communicates a packet or a frame using an arbitrary transmit polarization is described. This electronic device includes: a first antenna having a first predefined polarization; a second antenna having a second predefined polarization, where the second predefined polarization is different from the first predefined polarization; and an interface circuit, communicatively coupled to the first antenna and the second antenna. During operation, the interface circuit provides, to the first antenna, first electrical signals corresponding to a packet or a frame. Moreover, the interface circuit provides, to the second antenna, second electrical signals corresponding to the packet or the frame. Note that the second electrical signals have a same magnitude as the first electrical signals, and the second electrical signals are provided to the second antenna concurrently as the first electrical signals are provided to the first antenna.

Another embodiment provides the interface circuit.

Another embodiment provides a computer-readable storage medium with program instructions for use with the electronic device. When executed by the electronic device, the program instructions cause the electronic device to perform at least some of the aforementioned operations in one or more of the preceding embodiments.

Another embodiment provides a method, which may be performed by the electronic device. This method includes at least some of the aforementioned operations in one or more of the preceding embodiments.

In a fourth group of embodiments, an electronic device that communicates a packet or a frame using an arbitrary transmit polarization is described. This electronic device includes: a first set of antenna elements having a first predefined polarization; a second set of antenna elements having a second predefined polarization, where the second predefined polarization is different from the first predefined polarization; and an interface circuit, communicatively coupled to the first set of antenna elements and the second set of antenna elements. During operation, the interface circuit selects one or more first antenna elements in the first set of antenna elements and one or more second antenna elements in the second set of antenna elements, where the first antenna elements correspond to a first antenna pattern and the second antenna elements correspond to a second antenna pattern. Then, the interface circuit provides, to the first antenna elements, first electrical signals corresponding to the packet or the frame, and provides, to the second antenna elements, second electrical signals corresponding to the packet or the frame. Note that the second electrical signals have a same magnitude as the first electrical signals, and the second electrical signals are provided to the second antenna elements concurrently as the first electrical signals are provided to the first antenna elements.

Another embodiment provides the interface circuit.

Another embodiment provides a computer-readable storage medium with program instructions for use with the electronic device. When executed by the electronic device, the program instructions cause the electronic device to perform at least some of the aforementioned operations in one or more of the preceding embodiments.

Another embodiment provides a method, which may be performed by the electronic device. This method includes at least some of the aforementioned operations in one or more of the preceding embodiments.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
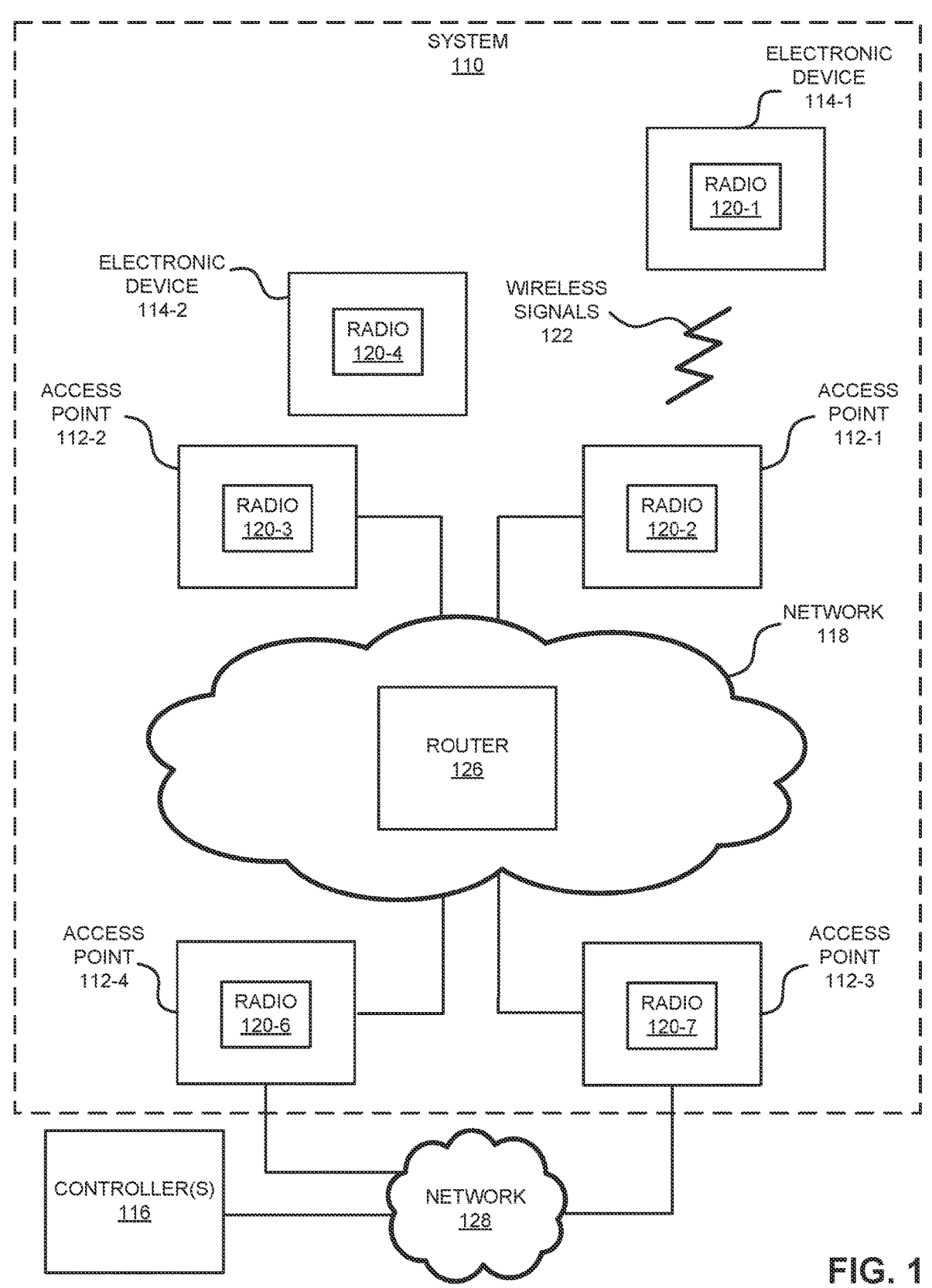
FIG. 1 is a block diagram illustrating an example of communication among electronic devices in accordance with an embodiment of the present disclosure.

An electronic device that communicates a packet or a frame using an arbitrary transmit polarization (or orientation of the electric field) is described. This electronic device includes: a first antenna having a first predefined polarization; and a second antenna having a second predefined polarization, where the second predefined polarization is different from the first predefined polarization. During operation, an interface circuit in the electronic device selectively transmits, from the first antenna, first wireless signals corresponding to the packet or the frame. Moreover, the interface circuit selectively transmits, from the second antenna, second wireless signals corresponding to the packet or the frame, where the second wireless signals have a same magnitude as the first wireless signals, and the second wireless signals are transmitted from the second antenna concurrently (or at the same time) as the first wireless signals are transmitted from the first antenna. Note that the interface circuit may dynamically modify the transmit polarization during the communication.

By dynamically modifying the transmit polarization, these communication techniques may adapt to a changing wireless communication environment. Notably, the electronic device may reduce or eliminate fading that may occur because of mismatch between the polarization of the wireless signals and the polarization of a receive antenna. For example, at a given time, a recipient electronic device may be at a spatial location where the first predefined polarization or the second predefined polarization has better communication performance. Based at least in part on feedback from the recipient electronic device (such as an acknowledgment, throughput, a received signal strength indicator, a signal-to-noise ratio and/or, more generally, a communication-performance metric), the interface circuit may adapt or change the transmit polarization, such as by discontinuing the first or the second wireless signals, or by disconnecting the first or the second wireless signals from, respectively, the first antenna or the second antenna. Alternatively or additionally, the interface circuit may modify a relative phase of the first wireless signals and the second wireless signals, so that the polarization of the transmitted wireless signals will be different than either the polarization of the first antenna or the polarization of the second antenna. In this manner, the interface circuit may select any arbitrary transmit polarization and, thus, may improve (or optimize) the communication performance (such as the throughput) with the recipient electronic device at a given time. Consequently, these communication techniques may improve the user experience when using the electronic device or the recipient electronic device.

In the discussion that follows, electronic devices or components in a system communicate packets in accordance with a wireless communication protocol, such as: a wireless communication protocol that is compatible with an IEEE 802.11 standard (which is sometimes referred to as from the 'Wi-Fi®,' from the Wi-Fi Alliance of Austin, Texas), Bluetooth® (from the Bluetooth Special Interest Group of Kirkland, Washington), and/or another type of wireless interface (such as another wireless-local-area-network (interface). Moreover, an access point in the system may communicate with a controller or services using a wired communication protocol, such as a wired communication protocol that is compatible with an Institute of Electrical and Electronics Engineers (IEEE) 802.3 standard (which is sometimes referred to as 'Ethernet'), e.g., an Ethernet II standard. However, a wide variety of communication protocols may be used in the system, including wired and/or wireless communication. In the discussion that follows, Ethernet and Wi-Fi are used as illustrative examples.

We now describe some embodiments of the communication techniques. FIG. 1 presents a block diagram illustrating an example of a system 110, which may include components, such as: one or more access points 112, one or more electronic devices 114 (such as cellular telephones, stations, another type of electronic device, etc.), and one or more optional controllers 116. In system 110, the one or more access points 112 may wirelessly communicate with the one or more electronic devices 114 using wireless communication that is compatible with an IEEE 802.11 standard. Thus, the wireless communication may occur in a 2.4 GHz, a 5 GHz and/or a 60 GHz frequency band. (Note that IEEE 802.11ad communication over a 60 GHz frequency band is sometimes referred to as 'WiGig.' in the present discussion, these embodiments also encompassed by 'Wi-Fi.') However, a wide variety of frequency bands may be used.

Moreover, wired and/or wireless communication among access points 112 in a WLAN may occur via network 118 (such as an intra-net, a mesh network, point-to-point connections and/or the Internet) and may use a network communication protocol, such as Ethernet. This network may include one or more routers and/or switches, such as router 126.

As noted previously, the one or more access points 112 and the one or more electronic devices 114 may communicate via wireless communication. Notably, one or more of access points 112 and one or more of electronic devices 114 may wirelessly communicate while: transmitting advertising frames on wireless channels, detecting one another by scanning wireless channels, exchanging subsequent data/management frames (such as association requests and responses) to establish a connection, configure security options (e.g., Internet Protocol Security), transmit and receive frames or packets via the connection (which may include the association requests and/or additional information as payloads), etc.

In some embodiments, the wired and/or wireless communication among access points 112 also involves the use of dedicated connections, such as via a peer-to-peer (P2P) communication technique. Therefore, access points 112 may support wired communication within the WLAN (such as Ethernet) and wireless communication within the WLAN (such as and one or more of access points 112 may also support a wired communication protocol (such as Ethernet) for communicating via network 128 (such as the Internet) with other electronic devices, such as a computer or the one or more optional controllers 116 of the WLAN. Note that the one or more optional controllers 116 may be at the same location as the other components in system 110 or may be located remotely (i.e., at a different location). Moreover, note that the one or more access points 112 may be managed by the one or more optional controllers 116. Furthermore, note that the one or more access points 112 may be a physical access point or a virtual or 'software' access point that is implemented on a computer or an electronic device.

Figure 8:
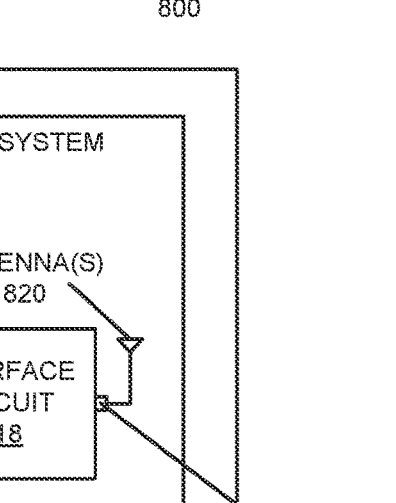
FIG. 8 is a block diagram illustrating an example of an electronic device in accordance with an embodiment of the present disclosure.

As described further below with reference to FIG. 8, the one or more access points 112, the one or more electronic devices 114 and/or the one or more optional controllers 116 may include subsystems, such as a networking subsystem, a memory subsystem and a processor subsystem. In addition, the one or more access points 112 and the one or more electronic devices 114 may include radios 120 in the networking subsystems. More generally, the one or more access points 112 and the one or more electronic devices 114 can include r can be included within) any electronic devices with the networking subsystems that enable the one or more access points 112 and the one or more electronic devices 114 to wirelessly communicate with each other.

As can be seen in FIG. 1, wireless signals 122 (represented by a jagged line) are transmitted from a radio 120-2 in at least one of the one or more access points 112, such as access point 112-1, These wireless signals are received by radio 120-1 in electronic device 114-1. In particular, access point 112-1 may transmit frames or packets. In turn, these frames or packets may be received by electronic device 114-1. This may allow access point 112-1 to communicate information to electronic device 114-1. Note that the communication between electronic device 114-1 and access point 112-1 may be characterized by a variety of performance metrics, such as: a data rate, a data rate for successful communication (which is sometimes referred to as a 'throughput'), an error rate (such as a retry or reseed rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). While instances of radios 120 are shown in the one or more electronic devices 114 and the one or more access points 112, one or more of these instances may be different from the other instances of radios 120.

As noted previously, because the polarization of a wireless signal may change when the wireless signal is reflected from a surface, the polarization of wireless signals at a client is typically different from the polarization of the wireless signals at the transmit antennas. Moreover, the use of a static or predefined polarization may not be optimal at a given location of a client. For example, because of reflections, a wireless signal that is transmitted from an antenna at a predefined polarization (such as a vertical or a horizontal polarization) may have a significantly different polarization at the client. If the client device is configured to receive signals having the predefined polarization, then because of the mismatch between the polarization of the receive antenna and the polarization of the wireless signal at the receive antenna, the magnitude of the received signal may be significantly reduced. Consequently, there may be a communication-performance opportunity cost associated with the use of a wireless signal having a predefined polarization.

In order to address this challenge, the one or more access points 112 (such as access point 112-1) may implement or use the communication techniques. Notably, as discussed further below with reference to FIGS. 2-7, during the communication techniques access point 112-1 may communicate a packet or a frame to electronic device 114-1) using a wireless signal that has any arbitrary transmit polarization. The polarization of the transmitted wireless signal may be selected to improve performance. For example, a transmit circuit (such as a transceiver, e.g., in radio 120-2, having a common transmit path) may transmit wireless signals corresponding to the packet or the frame using one or more antennas. These antennas may have different predefined polarizations, such as a first antenna having a horizontal polarization and a second antenna having a vertical polarization. When, e.g., at least the first and the second antennas are used, the wireless signals transmitted by the first and the second antennas may have the same magnitude (and, thus, may be spatially correlated), but may have relative phase, i.e., the phases of the two wireless signals may be different. (However, in other embodiments, the antennas may transmit the same electrical signals, but the magnitudes and/or the phases of the wireless signals may be different.) Moreover, the wireless signals may be transmitted concurrently. Note that the first and the second antenna may be co-located (i.e., spatially proximate to each other) or may be at different locations or spatially offset from each other. In some embodiments, access point 112-1 may communicate the packet or the frame using MIMO. For example, access point 112-1 may use 2×2, 4×4, 8×8, 16×16 or N×N (where N is an integer) MIMO.

Moreover, which of the antenna(s) (and, thus, the polarization) are used to transmit the wireless signals and/or the relative phase of the wireless signals transmitted by the first and the second antennas may be dynamically selected or changed. (More generally, the antenna(s) used, the magnitude and/or the relative phase may be dynamically selected or changed.) For example, the relative phase of electrical signals corresponding to the wireless signals transmitted by the first and/or the second antennas may be changed by the transceiver and/or by a phase-modification element (such as a tapped delay line) between the transceiver and at least one of the first antenna and the second antenna. Moreover, access point 112-1 may switch from the first antenna to the second antenna or to the first antenna and the second antenna. Consequently, access point 112-1 may use an arbitrary polarization (linear, e.g., horizontal, vertical or any slant, circular or elliptical).

Note that access point 112-1 may dynamically (or on the fly) change the polarization based at least in part on feedback received from electronic device 114-1 (or, more generally, the recipient electronic device). For example, the feedback may include: an acknowledgment, information specifying a throughput, information specifying a received signal strength indicator, information specifying a signal-to-noise ratio and/or information specifying another communication-performance metric. In some embodiments, the dynamic changing of the polarization may be based at least in part on the recipient electronic device, such as electronic device 114-1. Therefore, the dynamic changing of the polarization may be performed on a device-specific basis.

Similarly, the communication techniques may be used to receive another packet or frame (e.g., from electronic device 114-1) using an arbitrary polarization. Notably, access point 112-1 may dynamically select or change the receive polarization by: selecting at least the first and/or the second antenna(s) having different predefined polarizations used to receive wireless signals, and/or weighing or filtering the magnitudes and/or the relative phase of electrical signals corresponding to the wireless signals received at the at least first or second antenna(s) based at least in part on a communication-performance metric of or associated with communication with electronic device 114-1 (such as a received signal strength, a throughput, etc.). For example, a transceiver in radio 120-2 may concurrently receive wireless signals having the same magnitude from a first antenna having a first polarization (such as a horizontal polarization), a second antenna having a second polarization (such as a vertical polarization), or both. Alternatively, transceiver in radio 120-2 may concurrently receive and combine wireless signals from a first antenna having a first polarization (such as a horizontal polarization), a second antenna having a second polarization (such as a vertical polarization), where the magnitude and/or relative phase of the received wireless signal is changed to adjust the receive polarization of the access point 112-1.

In some embodiments, the antennas having the different polarization (for transmit and/or receive) may be single-band or dual-band antennas. For example, the antennas may operate in a 2.4 GHz band of frequencies, a 5 GHz band of frequencies, or both. Note that these bands of frequencies are used as an illustration. In general, the communication techniques may be used in a wide variety of bands of frequencies.

In this way, the communication techniques may facilitate dynamic adaptation of the transmit and/or the receive polarization. This capability may address dynamic changes in a communication environment. For example, at a given location, a horizontal polarization may have a fading null, while a vertical polarization may not (and, thus, may have a received signal strength that is 10-20 dB larger). By dynamically switching from, e.g., the horizontal polarization to the vertical polarization in this circumstance, the communication techniques may significantly improve the communication performance in system 110. Similarly, switching to a slant polarization or to a circular polarization may improve performance.

In the described embodiments, processing a frame or a packet in the electronic devices and/or the one or more access points may include: receiving wireless signals 122 with the frame or packet; decoding/extracting the frame or packet from the received wireless signals 122 to acquire the frame or packet; and processing the frame or packet to determine information contained in the frame or packet.

Although we describe the network environment shown in FIG. 1 as an example, in alternative embodiments, different numbers or types of electronic devices or components may be present. For example, some embodiments comprise more or fewer electronic devices or components. Therefore, in some embodiments there may be fewer or additional instances of at least some of the one or more access points 112, the one or more electronic devices 114, and/or the one or more optional controllers 116. As another example, in another embodiment, different electronic devices are transmitting and/or receiving frames or packets.

Figure 2:
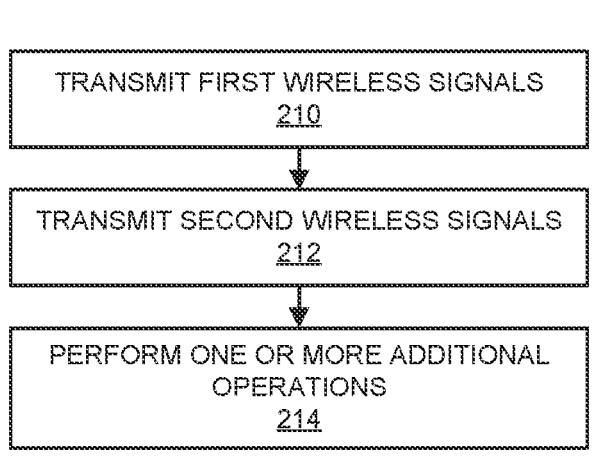
FIG. 2 is a flow diagram illustrating an example of a method for communicating a packet or a frame using an arbitrary transmit polarization in accordance with an embodiment of the present disclosure.

We now describe embodiments of the method. FIG. 2 presents a flow diagram illustrating an example of a method 200 for communicating a packet or a frame using an arbitrary transmit polarization. Moreover, method 200 may be performed by an electronic device, such as one of the one or more access points 112 in FIG. 1, e.g., access point 112-1. During operation, the electronic device may transmit, from a first antenna having a first predefined polarization, first wireless signals (operation 210) corresponding to the packet or the frame. Moreover, the electronic device may transmit, from a second antenna having a second predefined polarization that is different from first predefined polarization, second wireless signals (operation 212) corresponding to the packet or the frame, where the second wireless signals optionally have a same magnitude as the first wireless signals, and the second wireless signals are transmitted from the second antenna concurrently (or at the same time) as the first wireless signals are transmitted from the first antenna.

Note that the first predefined polarization may be in a horizontal direction and the second predefined polarization may be in a vertical direction. More generally, a given polarization may be: vertical, horizontal, circular or slant. These different configurations may be implemented with a separate antenna or a reconfigurable antenna.

Moreover, an interface circuit in the electronic device, which provides electrical signals corresponding to the first wireless signals and the second wireless signals, may include a common transmit path, and the electrical signals may be provided to the first antenna and the second antenna using the common transmit path. Furthermore, the electronic device may communicate the packet or the frame using MIMO. For example, the electronic device may use 2×2, 4×4, 8×8, 16×16 or N×N (where N is an integer) MIMO. The first antenna and the second antenna may be dual band antennas that operate in a first band of frequencies and a second band of frequencies. Alternatively, the first antenna and the second antenna may operate in a single band of frequencies, such as the first band of frequencies, the second band of frequencies or another (different) band of frequencies. Note that the second antenna may be spatially offset from the first antenna. Alternatively, the first antenna and the second antenna may be co-located (or proximate) in the electronic device. In some embodiments, instead of separate first and second antennas, there may be a first antenna element and a second antenna element that are included in the same antenna.

In some embodiments, the electronic device optionally performs one or more additional operations (operation 214). Notably, a phase of the second wireless signals may be different from a phase of the first wireless signals. In some embodiments, the electronic device may dynamically change the phase of electrical signals corresponding to the second wireless signals relative to the phase of electrical signals corresponding to the first wireless signals. For example, the electronic device may receive information that specifies feedback (such as an acknowledgment, throughput, a received signal strength indicator, a signal-to-noise ratio and/or, more generally, a communication-performance metric) associated with a second electronic device (such as a recipient electronic device), and the electronic device may change the phase of the electrical signals corresponding to the second wireless signals based at least in part on the feedback. Alternatively or additionally, the electronic device may include a phase-modification element (such as a tapped delay line) between the interface circuit and at least one of the first antenna and the second antenna, and the phase-modification element may change the phase of the electrical signals corresponding to the first wireless signals and/or the electrical signals corresponding to the second wireless signals based at least in part on a signal from the interface circuit. Note that by changing the phase, the phase-modification element may change a given polarization or antenna pattern.

Furthermore, the electronic device may change a given antenna pattern of the first antenna or the second antenna. For example, the given antenna pattern may be changed based at least in part on the feedback. Notably, the electronic device may selectively discontinue transmitting the first wireless signals or the second wireless signals or may selectively disconnect the first antenna or the second antenna based at least in part on the feedback. Thus, the interface circuit may dynamically select the first antenna and/or the second antenna. This dynamic selection may be performed on the fly. In some embodiments, the first wireless signals and the second wireless signals may specify or may be addressed to at least a recipient electronic device, and/or the dynamic selection may be performed on a device-specific basis.

Additionally, the electronic device may selectively receive, at the first antenna, third wireless signals corresponding to a second packet or a second frame; receive, at the second antenna, fourth wireless signals corresponding to the second packet or the second frame; or receive, at the first antenna, the third wireless signals and receive, at the second antenna, the fourth wireless signals. Note that the fourth wireless signals may optionally have a same magnitude as the third wireless signals, and the fourth wireless signals may be received at the second antenna concurrently or at the same time as the third wireless signals are received at the first antenna.

The interface circuit may change the polarization by be dynamically changing a phase of electrical signals corresponding to the third wireless signals relative to a phase of electrical signals corresponding to the fourth wireless signals. Alternatively or additionally, the electronic device may include the phase-modification element between the interface circuit and at least one of the first antenna and the second antenna, and the phase-modification element may change the phase of the electrical signals corresponding to third wireless signals and/or the electrical signals corresponding to fourth wireless signals based at least in part on a second signal from the interface circuit. The dynamic changes in the receive polarization may be based at least in part on a communication-performance metric of or associated with the communication with the second electronic device.

In some embodiments of method 200, there may be additional or fewer operations. Moreover, the order of the operations may be changed, and/or two or more operations may be combined into a single operation.

Figure 3:
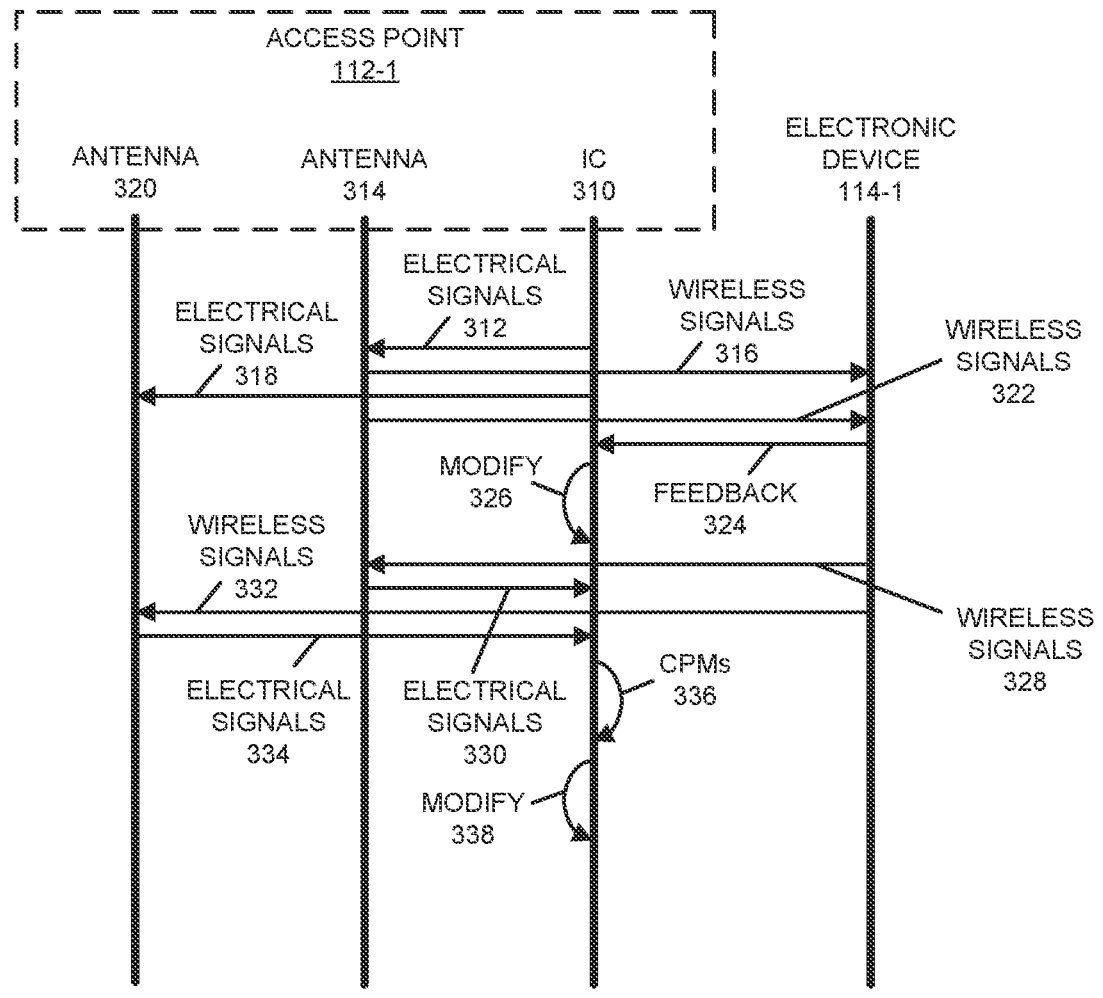
FIG. 3 is a drawing illustrating an example of communication among the electronic devices in FIG. 1 in accordance with an embodiment of the present disclosure.

Embodiments of the communication techniques are further illustrated in FIG. 3, which presents a drawing illustrating an example of communication between access point 112-1 and electronic device 114-1 according to some embodiments. Notably, interface circuit 310 in access point 112-1 may provide electrical signals 312 corresponding to a packet or a frame to antenna 314 that has a first predefined polarization, and which transmits corresponding wireless signals 316. Moreover, interface circuit 310 in access point 112-1 may concurrently provide electrical signals 318 to antenna 320 that has a second (different) predefined polarization, and which transmits corresponding wireless signals 322. Note that wireless signals 316 and 322 may optionally have the same magnitude and may specify a packet or a frame that specifies or that is addressed to electronic device 114-1. However, in some embodiments, wireless signals 316 and 322 may have different relative magnitude and/or phase, i.e., there may be a non-zero relative phase.

After receiving wireless signals 316 and/or 322, electronic device 114-1 may provide feedback 324 to access point 112-1. After receiving feedback 324 (such as an acknowledgment and/or information that specifies a communication-performance metric, such as a received signal strength, a throughput, etc.), interface circuit 310 may dynamically modify 326 the polarization of the transmitted wireless signal. For example, based at least in part on feedback 324, interface circuit 310 may discontinue transmitting wireless signals 316 or 322, or may disconnect from antenna 314 or 320. Thus, interface circuit 310 may dynamically select or use antenna 314, antenna 322, or both during the transmission. Alternatively or additionally, interface circuit 310 may dynamically change the relative magnitude and/or phase of electrical signals 312 and 318 based at least in part on feedback 324.

Moreover, electronic device 114-1 may transmit another packet or a frame to access point 112-1. Antenna 314 may selectively receive wireless signals 328 corresponding to the other packet, and may provide electrical signals 330 to interface circuit 310. In addition, antenna 322 may concurrently receive wireless signals 332 corresponding to the other packet, and may provide electrical signals 334 to interface circuit 310. Note that the relative magnitude and/or phase of wireless signals 328 and 332 may be adjusted in order to adjust the receive polarization.

Thus, interface circuit 310 may determine one or more communication-performance metrics (CPMs) 336 using electrical signals 330 and/or 334, such as a received signal strength, a throughput, etc. Based at least in part on the one or more communication-performance metrics 336, interface circuit 310 may modify 338 the polarization of the received wireless signals. For example, based at least in part on the one or more communication-performance metrics 336, interface circuit 310 may disconnect from antenna 314 or 320. Thus, interface circuit 310 may dynamically select or use antenna 314, antenna 320, or both during the receiving. Alternatively or additionally, interface circuit 310 may dynamically change the relative magnitude and/or phase of electrical signals 330 and 334 based at least in part on one or more communication-performance metrics 336.

While FIG. 3 illustrates communication between components using unidirectional or bidirectional communication with lines having single arrows or double arrows, in general the communication in a given operation in this figure may involve unidirectional or bidirectional communication.

Figure 4:
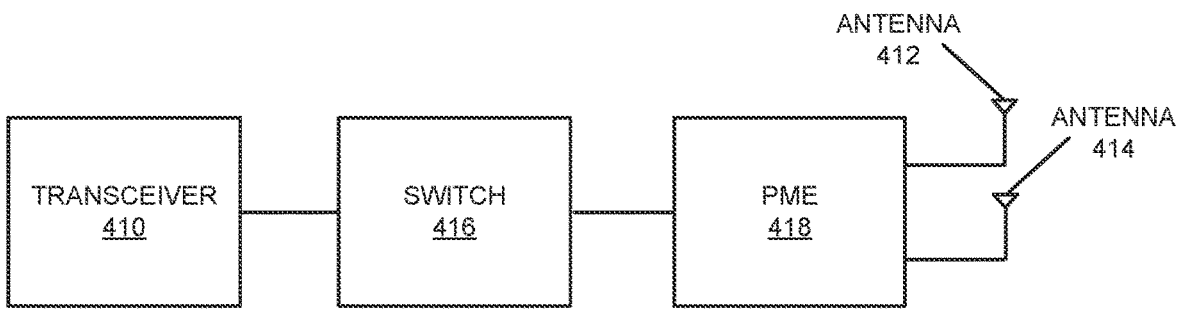
FIG. 4 is a drawing illustrating an example of antennas having a selectable polarization in accordance with an embodiment of the present disclosure.

In some embodiments of the communication techniques, an access point may dynamically select an arbitrary polarization, as opposed to using separate antennas with horizontal polarization (parallel to the ground) and vertical polarization (perpendicular to the ground). This is shown in FIG. 4, which presents a drawing illustrating an example of antennas 412 and 414 having a selectable net polarization. Notably, transceiver 410 may be selectively coupled to antennas 412 and 414, which have different predefined polarizations. For example, switch 416 may selectively couple transceiver 410 to either or both of antennas 412 and 414. Note that antennas 412 and 414 may be spatially offset from each other.

As noted previously, transceiver 410 may provide electrical signals to antennas 412 and 414 that optionally have the same magnitude. However, in some embodiments, the magnitudes and/or the phases of these electrical signals may be different (i.e., the relative phase may be non-zero). For example, transceiver 410 may adjust or change the phases of the electrical signals. Alternatively or additionally, an optional phase-modification element (PME) 418 or circuit may change at least one of the phases based at least in part on a control signal from transceiver 410.

Figure 5:
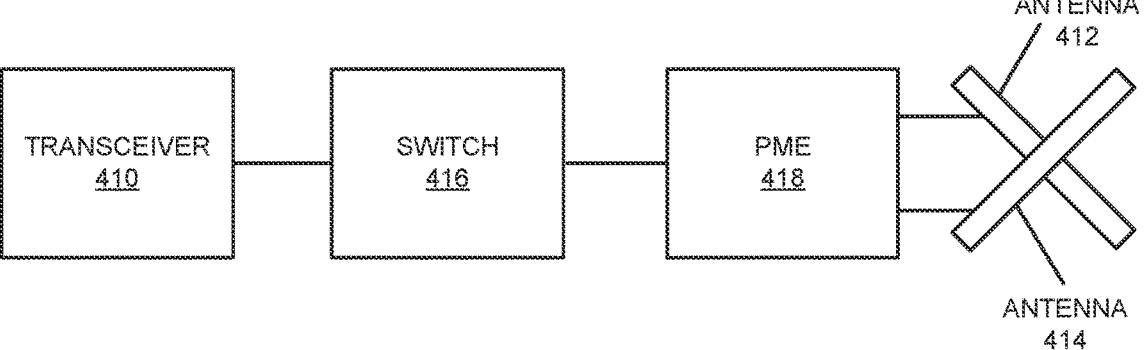
FIG. 5 is a drawing illustrating an example of antennas having a selectable polarization in accordance with an embodiment of the present disclosure.

While FIG. 4 illustrates antennas 412 and 414 as being spatially offset from each other, in other embodiments the antennas may be co-located. This is shown in FIG. 5, which presents a drawing illustrating an example of antennas 412 and 414 having a selectable polarization. Notably, in FIG. 5, antennas 412 and 414 have cross linear polarizations.

Using either of the configurations shown in FIGS. 4 and 5, an arbitrary net polarization may be created. For example, the transmitted wireless signals may have linear polarization (such as horizontal or vertical polarization), circular polarization or elliptical polarization. This may allow the optimum transmit or receive polarization for a particular wireless path to be determined and used.

Figure 6:
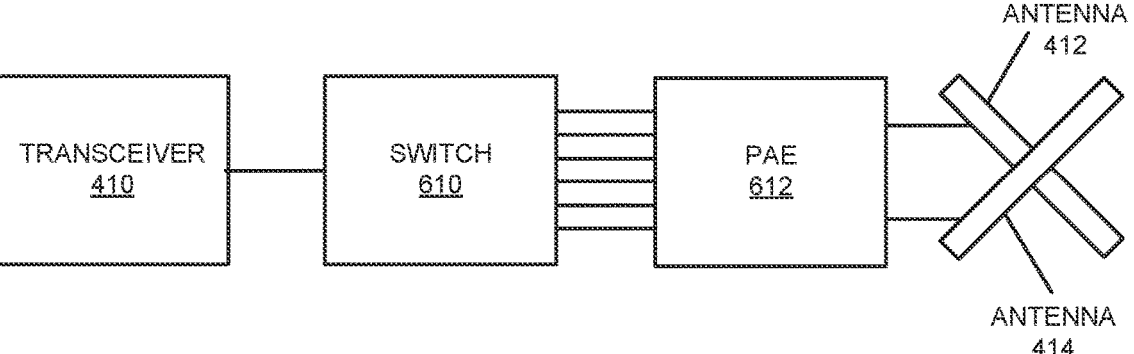
FIG. 6 is a drawing illustrating an example of antennas having a selectable polarization in accordance with an embodiment of the present disclosure.

FIG. 6 presents a drawing illustrating an example of antennas 412 and 414 having a selectable polarization. Notably, an electronic device may have a feed network. This feed network may include a single-pole, six-throw switch 610 that is coupled to a radio port in a transceiver 410. This switch 610 may have six possible outputs corresponding to different polarizations: slant left, slant right, vertical, horizontal, left-hand circular, and right-hand circular. Moreover, a phase and amplitude matrix (PAE) 612 may provide, based at least in part on the output from switch 610, electrical signals having amplitudes and phases to antennas 412 and 414. Table 1 illustrates examples of the amplitudes and the phases provided to antennas 412 and 414.

TABLE 1

| Polarization | Antenna 412 | | Antenna 414 | |
|---|---|---|---|---|
| | Amplitude | Phase (°) | Amplitude | Phase (°) |
| Slant left | 0 | — | 1 | 0 |
| Slant right | 1 | 0 | 0 | — |
| Vertical | 1 | 0 | 1 | −180 |
| Horizontal | 1 | 0 | 1 | 0 |
| Left-hand circular polarized | 1 | −90 | 1 | 0 |
| Right-hand circular polarized | 1 | 0 | 1 | −90 |

Figure 7:
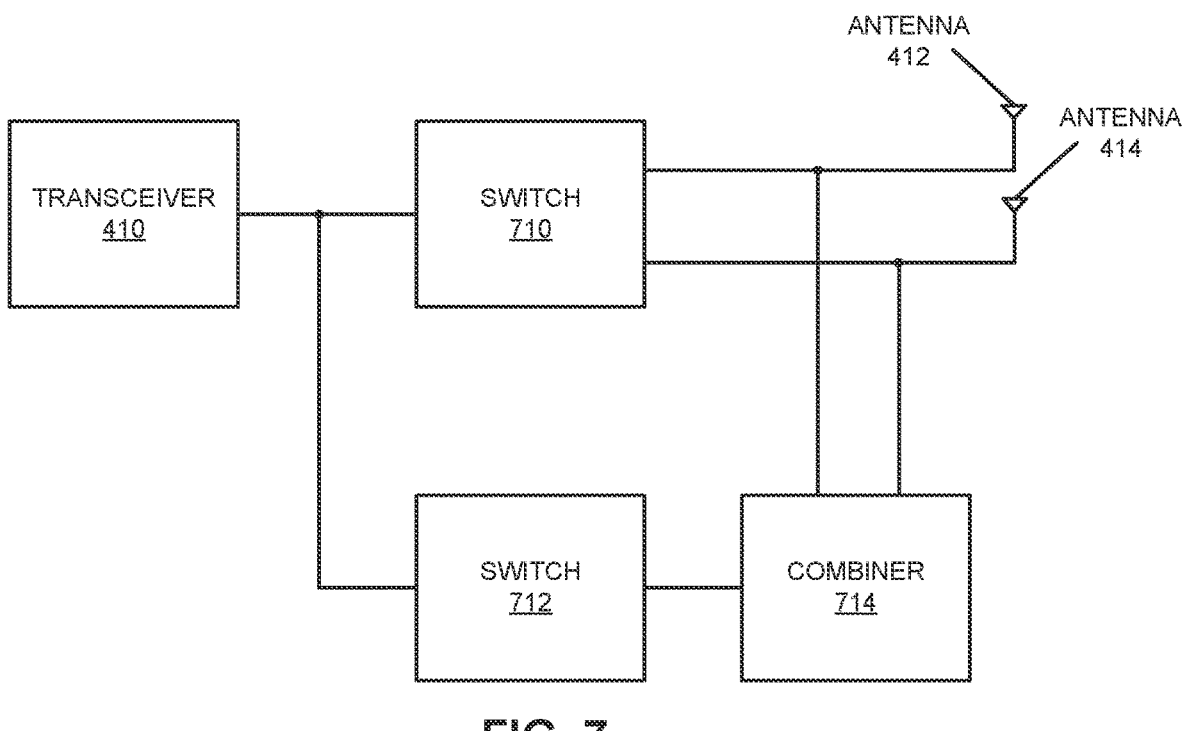
FIG. 7 is a drawing illustrating an example of antennas having a selectable polarization in accordance with an embodiment of the present disclosure.

FIG. 7 presents a drawing illustrating an example of antennas 412 and 414 having a selectable polarization. Notably, transceiver 410 may selectively provide electrical signals to antennas 412 and/or 414 via switch 710 or switch 712 and combiner 714. Notably, switch 710 may selectively provide electrical signals to either antenna 412 or 414. Alternatively, switch 712 and combiner 714 may selectively provide electrical signals to both of antennas 412 and 414. In response to the electrical signals, the selected antennas 412 and/or 414 may transmit wireless signals having an arbitrary net polarization.

While FIG. 7 illustrates transmission, a similar configuration may be used during receiving. In some embodiments, a pair of antennas having predefined polarizations may be used for transmitting and for receiving. For example, the pair of antennas may be time multiplexed for transmitting and for receiving.

Note that the preceding embodiments may include fewer or additional components, two or more components may be combined into a single component, and/or positions of one or more components may be changed.

Using the communication techniques, an electronic device may select between multiple possible polarizations, such as: horizontal, vertical, slant linear, circular or elliptical polarizations. This capability may help with wireless paths that have a reduced signal. Notably, propagation (such as indoors) may degrade with the first 'bounce' or reflection. Moreover, the polarization of the wireless signals may change on reflection. Consequently, there is no way to know which polarization is dominant in a communication environment.

The communication techniques may address this problem by allowing an arbitrary polarization to be dynamically selected. This capability may allow effects such as interference, cross-polarization loss and/or fading to be reduced or eliminated. Moreover, in contrast with the use of a circular polarized receive antenna to receive a linearly polarized wireless signal, the communication techniques may not suffer from a 3 dB loss.

In some embodiments, when fast fading occurs, it may not be possible for the access point to dynamically antennas adjust the polarization. Consequently, in these embodiments, the access point may use both a vertical and a horizontally polarized antenna. The resulting wireless signals may have a +45° polarization or a −45° polarization, which may reduce the impact of the fast fading. Note that the communication techniques may not increase the gain of the antenna radiation pattern. Instead, the communication techniques may reduce or eliminate the effect of a fading null at one polarization and/or a change in the polarization because of reflections.

In some embodiments, a given antenna may be or may include a monopole or a dipole (such as a bent dipole antenna) or a slot antenna. For example, a dipole antenna may have a horizontal polarization and a slot antenna may have a vertical polarization. However, a wide variety of types of antennas and/or antenna elements may be used. The antennas may be free-standing and/or may be implemented on a substrate or a printed-circuit board (e.g., FR4, Rogers 4003, or another dielectric material), such as by using metal or another radio-frequency conducting foil on one side of the substrate and a ground plane on the other (coplanar) side of the substrate. As discussed further below, one or more additional components may be optionally included on either or both sides of the substrate. Note that the given antenna may have a polarization substantially in a plane of the substrate.

Moreover, in some embodiments, in addition to dynamically modifying the polarization of the transmitted or the received wireless signals, the access point (and, more generally, an electronic device that implements the communication techniques) may dynamically change an antenna radiation pattern of the one or more of the antennas, so that the antenna radiation pattern varies or can be changed between an omnidirectional radiation pattern and a directional radiation pattern (which has gain in a particular direction relative to an omnidirectional radiation pattern, e.g., a cardioid directional radiation pattern).

For example, the given antenna may optionally include multiple antenna elements, such a dipoles (e.g., a bent dipole). In some embodiments, these antenna elements are implemented on a substrate. Moreover, an access point may include an antenna element selector (such as a radio-frequency switch, e.g., a single-pole, single-throw switch) that selectively couples a transceiver (or an associated radio-frequency feed port) to one or more of the antenna elements. Furthermore, the given antenna may optionally include one or more passive components, such as one or more directors and/or one or more reflectors. Thus, the given antenna may include a Yagi-uda antenna.

A director may be tuned to a slightly higher frequency than a given antenna element, may be electrically decoupled from the given antenna element, and may be selectively coupled to the ground plane via a PIN diode, a GaAs FET, a MEMS switch, or another radio-frequency switch. When a control signal from an interface circuit forward biases the PIN diode, the director may be coupled to ground and the director may not modify the radiation pattern of the given antenna element appreciably. Alternatively, when the control signal reverse biases the PIN diode, the director may be decoupled from ground and may re-radiate the wireless signals from the given antenna element, which may make the antenna radiation pattern more directional. For example, a director may provide 1-2 dB of gain for the given antenna element.

Additionally, a reflector may be tuned to a slightly lower frequency than the given antenna element, may be electrically decoupled from the given antenna element, and may be selectively coupled to the ground plane via a PIN diode or a radio-frequency switch. When the PIN diode is forward biased, the reflector may be coupled to ground and the director may reflect the wireless signals from the given antenna element, thereby making the antenna radiation pattern more directional. Alternatively, when the PIN diode is reversed biased, the reflector may be decoupled from ground and may not modify the radiation pattern of the given antenna element appreciably. Thus, by selecting particular antenna element(s) and selectively activating (or deactivating) the one or more directors and/or one or more reflectors, the antenna radiation pattern of a given antenna may be varied from directional to omnidirectional.

Note that dimensions of the individual components in the given antenna may be established by use of radio-frequency simulation software, such as IE3D from Zeland Software of Fremont, California. In some embodiments, the given antenna may include one or more additional components, such as passive components that implement phase or impedance matching, that change a resonance frequency, that broaden the frequency response (or bandwidth), etc. For example, in the 2.4 to 2.4835 band of frequencies, the frequency response of a dipole may be between 300-500 MHz.

Moreover, switching at radio frequency (as opposed to baseband) may allow the access point to have fewer up/down converters and may simplify impedance matching between the interface circuit and the antennas. For example, a given antenna may provide an impedance match under all configurations of selected antenna elements, regardless of which antenna elements are selected. In some embodiments, a match with less than 10 dB return loss may be maintained under all configurations of selected antenna elements, over the range of frequencies (such as a band of frequencies in an IEEE 802.11 standard), regardless of which antenna elements are selected.

Alternatively or additionally to using antenna elements to vary the antenna radiation pattern, in some embodiments the communication techniques may be used in conjunction with beamforming. Note that the changes in the antenna radiation pattern and/or the beamforming may be used during transmission and/or receiving.

We now describe embodiments of an electronic device, which may perform at least some of the operations in the communication techniques. For example, the electronic device may include a component in system 110, such as one of: the one or more access points 112, the one or more electronic devices 114 and/or the one or more optional controllers 116. FIG. 8 presents a block diagram illustrating an electronic device 800 in accordance with some embodiments. This electronic device includes processing subsystem 810, memory subsystem 812, and networking subsystem 814. Processing subsystem 810 includes one or more devices configured to perform computational operations. For example, processing subsystem 810 can include one or more microprocessors, ASICs, microcontrollers, programmable-logic devices, graphical processor units (GPUs) and/or one or more digital signal processors (DSPs).

Memory subsystem 812 includes one or more devices for storing data and/or instructions for processing subsystem 810 and networking subsystem 814. For example, memory subsystem 812 can include dynamic random access memory (DRAM), static random access memory (SRAM), and/or other types of memory (which collectively or individually are sometimes referred to as a 'computer-readable storage medium'). In some embodiments, instructions for processing subsystem 810 in memory subsystem 812 include: one or more program modules or sets of instructions (such as program instructions 822 or operating system 824), which may be executed by processing subsystem 810. Note that the one or more computer programs may constitute a computer-program mechanism. Moreover, instructions in the various program instructions in memory subsystem 812 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 810.

In addition, memory subsystem 812 can include mechanisms for controlling access to the memory. In some embodiments, memory subsystem 812 includes a memory hierarchy that comprises one or more caches coupled to a memory in electronic device 800. In some of these embodiments, one or more of the caches is located in processing subsystem 810.

In some embodiments, memory subsystem 812 is coupled to one or more high-capacity mass-storage devices (not shown). For example, memory subsystem 812 can be coupled to a magnetic or optical drive, a solid-state drive, or another type of mass-storage device. In these embodiments, memory subsystem 812 can be used by electronic device 800 as fast-access storage for often-used data, while the mass-storage device is used to store less frequently used data.

Networking subsystem 814 includes one or more devices configured to couple to and communicate on a wired and/or wireless network (i.e., to perform network operations), including: control logic 816, an interface circuit 818 and one or more antennas 820 (or antenna elements). (While FIG. 8 includes one or more antennas 820, in some embodiments electronic device 800 includes one or more nodes, such as nodes 808, e.g., a pad, which can be coupled to the one or more antennas 820. Thus, electronic device 800 may or may not include the one or more antennas 820.) For example, networking subsystem 814 can include a Bluetooth networking system, a cellular networking system (e.g., a 3G/4G/5G network such as UMTS, LIE, etc.), a USB networking system, a networking system based on the standards described in IEEE 802.11 (e.g., a Wi-Fi networking system), an Ethernet networking system, and/or another networking system.

In some embodiments, a transmit antenna radiation pattern of electronic device 800 may be adapted or changed using pattern shapers (such as reflectors) in one or more antennas 820 (or antenna elements), which can be independently and selectively electrically coupled to ground to steer the transmit antenna radiation pattern in different directions. Thus, if one or more antennas 820 includes IV antenna-radiation-pattern shapers, the one or more antennas 820 may have $2^N$ different antenna-radiation-pattern configurations. More generally, a given antenna radiation pattern may include amplitudes and/or phases of signals that specify a direction of the main or primary lobe of the given antenna radiation pattern, as well as so-called 'exclusion regions' or 'exclusion zones' (which are sometimes referred to as 'notches' or 'nulls'). Note that an exclusion zone of the given antenna radiation pattern includes a low-intensity region of the given antenna radiation pattern. While the intensity is not necessarily zero in the exclusion zone, it may be below a threshold, such as 4 dB or lower than the peak gain of the given antenna radiation pattern. Thus, the given antenna radiation pattern may include a local maximum (e.g., a primary beam) that directs gain in the direction of an electronic device that is of interest, and one or more local minima that reduce gain in the direction of other electronic devices that are not of interest. In this way, the given antenna radiation pattern may be selected so that communication that is undesirable (such as with the other electronic devices) is avoided to reduce or eliminate adverse effects, such as interference or crosstalk.

Networking subsystem 814 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 800 may use the mechanisms in networking subsystem 814 for performing simple wireless communication between the electronic devices, e.g., transmitting frames and/or scanning for frames transmitted by other electronic devices.

Within electronic device 800, processing subsystem 810, memory subsystem 812, and networking subsystem 814 are coupled together using bus 828. Bus 828 may include an electrical, optical, and/or electro-optical connection that the subsystems can use to communicate commands and data among one another. Although only one bus 828 is shown for clarity, different embodiments can include a different number or configuration of electrical, optical, and/or electro-optical connections among the subsystems.

In some embodiments, electronic device 800 includes a display subsystem 826 for displaying information on a display, which may include a display driver and the display, such as a liquid-crystal display, a multi-touch touchscreen, etc.

Electronic device 800 can be (or can be included in) any electronic device with at least one network interface. For example, electronic device 800 can be (or can be included in): a desktop computer, a laptop computer, a subnotebook/netbook, a server, a computer, a mainframe computer, a cloud-based computer, a tablet computer, a smartphone, a cellular telephone, a smartwatch, a consumer-electronic device, a portable computing device, an access point, a transceiver, a controller, a radio node, a router, a switch, communication equipment, an access point, test equipment, and/or another electronic device.

Although specific components are used to describe electronic device 800, in alternative embodiments, different components and/or subsystems may be present in electronic device 800. For example, electronic device 800 may include one or more additional processing subsystems, memory subsystems, networking subsystems, and/or display subsystems. Additionally, one or more of the subsystems may not be present in electronic device 800. Moreover, in some embodiments, electronic device 800 may include one or more additional subsystems that are not shown in FIG. 8. Also, although separate subsystems are shown in FIG. 8, in some embodiments some or all of a given subsystem or component can be integrated into one or more of the other subsystems or component(s) in electronic device 800. For example, in some embodiments program instructions 822 is included in operating system 824 and/or control logic 816 is included in interface circuit 818.

Moreover, the circuits and components in electronic device 800 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit' or a 'means for communication') may implement some or all of the functionality of networking subsystem 814. The integrated circuit may include hardware and/or software mechanisms that are used for transmitting wireless signals from electronic device 800 and receiving signals at electronic device 800 from other electronic devices. Aside from the mechanisms herein described, radios are generally known in the art and hence are not described in detail. In general, networking subsystem 814 and/or the integrated circuit can include any number of radios. Note that the radios in multiple-radio embodiments function in a similar way to the described single-radio embodiments.

In some embodiments, networking subsystem 814 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals).

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Wi-Fi and/or Ethernet communication protocols as illustrative examples, in other embodiments a wide variety of communication protocols and, more generally, communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 822, operating system 824 (such as a driver for interface circuit 818) or in firmware in interface circuit 818. Alternatively or additionally, at least some of the operations in the communication techniques may be implemented in a physical layer, such as hardware in interface circuit 818.

Moreover, while the preceding embodiments illustrated the use of wireless signals in one or more bands of frequencies, in other embodiments of these signals may be communicated in one or more bands of frequencies, including: a microwave frequency band, a radar frequency band, 900 MHz, 2.4 GHz, 5 GHz, 60 GHz, and/or a band of frequencies used by a Citizens Broadband Radio Service or by LTE. In some embodiments, the communication between electronic devices uses multi-user transmission (such as orthogonal frequency division multiple access or OFDMA).

Furthermore, while the preceding embodiments illustrated the communication techniques with an access point, in other embodiments the communication techniques may be used with a wide variety of electronic devices, including: a desktop computer, a laptop computer, a subnotebook/netbook, a server, a computer, a mainframe computer, a cloud-based computer, a tablet computer, a smartphone, a cellular telephone, a smartwatch, a consumer-electronic device, a portable computing device, a transceiver, a controller, a radio node (e.g., an eNodeB), a router, a switch, communication equipment, a base station, test equipment, and/or another electronic device.

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the communication techniques, different numerical values may be used.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, a set of transmit antennas consisting of:

a first antenna having a first predefined polarization;

a second antenna having a second predefined polarization, wherein the second predefined polarization is different from the first predefined polarization, wherein the electronic device comprises an interface circuit communicatively coupled to the first antenna and the second antenna, wherein the interface circuit is configured to:

selectively transmit, from the first antenna, the second antenna or both, wireless signals having an arbitrary selectable polarization, wherein the wireless signals correspond to a packet or a frame, and wherein, when the wireless signals are transmitted by the first antenna and the second antenna, the wireless signals are concurrently transmitted from the first antenna and the second antenna, wherein the interface circuit is configured to dynamically change the phase of electrical signals corresponding to the wireless signals transmitted by the first antenna relative to the phase of electrical signals corresponding to the wireless signals transmitted by the second antenna so that the wireless signals transmitted from the first antenna have a different phase from the wireless signals transmitted from the second antenna.

2. The electronic device of claim 1, wherein the first predefined polarization is in a horizontal direction and the second predefined polarization is in a vertical direction.

3. The electronic device of claim 1, wherein, when the wireless signals are transmitted by the first antenna and the second antenna, the wireless signals transmitted from first antenna have a same magnitude as the wireless signals transmitted from the second antenna.

4. The electronic device of claim 1, wherein the interface circuit is configured to receive information that specifies feedback associated with a second electronic device; and
    wherein the dynamic change of the phase of the electrical signals corresponding to the wireless signals transmitted by the first antenna relative to the phase of the electrical signals corresponding to the wireless signals transmitted by the second antenna is based at least in part on the feedback.

5. The electronic device of claim 1, wherein the electronic device comprises a phase-modification element between the interface circuit and at least one of the first antenna and the second antenna; and
    wherein the phase-modification element is configured to dynamically change the phase of the electrical signals corresponding to the wireless signals transmitted by the first antenna relative to the phase of the electrical signals corresponding to the wireless signals transmitted by the second antenna.

6. The electronic device of claim 1, wherein the interface circuit is configured to change a given antenna pattern of the first antenna or the second antenna based at least in part on the feedback.

7. The electronic device of claim 1, wherein the interface circuit is configured to perform dynamic selection of the first antenna or the second antenna; and
    wherein the dynamic selection comprises: selectively discontinuing transmitting using the first antenna or the second antenna based at least in part on the feedback; or selectively disconnecting the first antenna or the second antenna based at least in part on the feedback.

8. The electronic device of claim 7, wherein dynamic selection of the first antenna or the second antenna is performed on a device-specific basis.

9. The electronic device of claim 1, wherein the interface circuit comprises a common transmit path to the first antenna and the second antenna, and, when the wireless signals are transmitted by the first antenna and the second antenna, the interface circuit is configured to provide electrical signals corresponding to the wireless signals to the first antenna and the second antenna using the common transmit path.

10. The electronic device of claim 1, wherein the interface circuit is configured to selectively receive, at the first antenna, the second antenna or both, second wireless signals corresponding to a second packet or a second frame; and
    wherein the second wireless signals have a second arbitrary selectable polarization.

11. The electronic device of claim 10, wherein the interface circuit is configured to dynamically change a phase of electrical signals corresponding to the second wireless signals received at the first antenna relative to a phase of electrical signals corresponding to the second wireless signals received at the second antenna.

12. The electronic device of claim 11, wherein the electronic device comprises a phase-modification element between the interface circuit and at least one of the first antenna and the second antenna; and
    wherein the phase-modification element is configured to change, based at least in part on a signal from the interface circuit, the phase of the electrical signals corresponding to the second wireless signals received at the first antenna relative to the phase of the electrical signals corresponding to the second wireless signals received at the second antenna.

13. The electronic device of claim 1, wherein the second antenna is spatially offset from the first antenna.

14. A method for communicating a packet or a frame using an arbitrary transmit polarization, comprising:
    by an electronic device, wherein the electronic device comprises a set of transmit antennas consisting of a first antenna and a second antenna:
    selecting an arbitrary selectable polarization; and
    selectively transmitting, from the first antenna having a first predefined polarization, the second antenna having a second predefined polarization or both, wireless signals having the arbitrary selectable polarization, wherein the wireless signals correspond to a packet or a frame, and
    wherein, when the wireless signals are transmitted by the first antenna and the second antenna, the wireless signals are concurrently transmitted from the first antenna and the second antenna,
    dynamically changing the phase of electrical signals corresponding to the wireless signals transmitted by the first antenna relative to the phase of electrical signals corresponding to the wireless signals transmitted by the second antenna so that the wireless signals transmitted from first antenna have a different phase from the wireless signals transmitted from the second antenna.

15. The method of claim 14, wherein the method comprises:
    receiving information that specifies feedback associated with a second electronic device; and
    when the dynamic changing of the phase of electrical signals is based at least in part on the feedback.

* * * * *